United States Patent
Nakashima et al.

(10) Patent No.: US 8,704,486 B2
(45) Date of Patent: Apr. 22, 2014

(54) ELECTRICITY STORAGE SYSTEM

(75) Inventors: Takeshi Nakashima, Moriguchi (JP); Hayato Ikebe, Moriguchi (JP); Yohei Yamada, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 57 days.

(21) Appl. No.: 13/427,170

(22) Filed: Mar. 22, 2012

(65) Prior Publication Data

US 2012/0235645 A1 Sep. 20, 2012

Related U.S. Application Data

(63) Continuation of application No. PCT/JP2011/072534, filed on Sep. 30, 2011.

(30) Foreign Application Priority Data

Oct. 15, 2010 (JP) ................................. 2010-232345

(51) Int. Cl.
*H02J 7/00* (2006.01)
(52) U.S. Cl.
USPC .......................................... 320/113; 320/107
(58) Field of Classification Search
USPC ................................ 320/107, 113, 128; 429/7
See application file for complete search history.

(56) References Cited

U.S. PATENT DOCUMENTS

2007/0188137 A1* 8/2007 Scheucher .................... 320/116
2010/0092854 A1 4/2010 Ha et al.

FOREIGN PATENT DOCUMENTS

| JP | 2002-222641 A | 8/2002 |
|----|---------------|--------|
| JP | 2003-111301 A | 4/2003 |
| JP | 2010-519677 A | 6/2010 |
| WO | 2008/050953 A1 | 5/2008 |

OTHER PUBLICATIONS

International Preliminary Report on Patentability for International Application No. PCT/JP2011/072534, issued May 8, 2013.
Written Opinion of the International Searching Authority for International Application No. PCT/JP2011/072534, mailed Nov. 8, 2011.

* cited by examiner

*Primary Examiner* — Edward Tso
*Assistant Examiner* — Aaron Piggush
(74) *Attorney, Agent, or Firm* — Cantor Colburn LLP

(57) ABSTRACT

An electricity storage system has secondary battery housing system racks in which secondary batteries and circuit blocks are respectively housed, and a power converter housing rack in which a power converter is housed, and which is orderly disposed together with the plurality of secondary battery housing system racks. The secondary battery housing system rack having a positive-electrode-side terminal directly connected to a positive-electrode-side terminal of the power converter by a positive-electrode bus and the secondary battery housing system rack having a negative-electrode-side terminal directly connected to a negative-electrode-side terminal of the power converter by a negative-electrode bus, are different from each other.

7 Claims, 7 Drawing Sheets

ELECTRICITY STORAGE SYSTEM

CROSS-REFERENCE TO RELATED APPLICATION

The present application is a continuation application of International Application No. PCT/JP2011/072534, filed Sep. 30, 2011, the entire contents of which are incorporated herein by reference and priority to which is hereby claimed. The PCT/JP2011/072534 application claimed the benefit of the date of the earlier filed Japanese Patent Application Nos. JP2010-232345, filed Oct. 15, 2010, the entire contents of which are incorporated herein by reference, and priority to which is hereby claimed.

TECHNICAL FIELD

The present invention relates generally to electricity storage systems, and more particularly to an electricity storage system provided with a plurality of secondary battery housing system racks in which secondary batteries are housed.

BACKGROUND ART

Use of an electricity storage device such as a secondary battery enables effective use of energy. For example, in recent years, the development of solar power generation systems for environmentally friendly clean energy has been energetically pursued. However, photoelectric conversion modules for converting solar light into electric power have no electricity storing functions. In some case, therefore, a photoelectric conversion module is used in combination with a secondary battery. For example, effective use of energy is made by charge/discharge control performed by temporarily storing electric power generated by a photoelectric conversion module in a secondary battery and by discharging the power from the secondary battery according to an external load requirement or the like.

For example, patent document 1, a document describing an art relating to the present invention, discloses a solar cell power supply apparatus having solar cells, a plurality of secondary batteries to be charged with electricity from the solar cells, charge switches connected between the secondary batteries and the solar cells to control charging of the secondary batteries, discharge switches connected between the secondary batteries and a load, and a control circuit that controls the charge and discharge switches. This document discloses a process in which a control circuit determines priorities with which charging of the secondary batteries is performed by controlling the plurality of charge switches, charges one of the secondary batteries with a higher priority earlier than it charges another of the secondary batteries with a lower priority, and charges the other of the secondary batteries with the lower priority after the completion of charging of a certain capacity in the secondary battery with the higher priority.

CITATION LIST

Patent Literature

Patent Literature 1: Japanese Patent Laid-Open Publication No. 2003-111301

SUMMARY OF INVENTION

Technical Problem

In some cases, because of a need to secure a sufficient charge/discharge capacity according to specifications of a load facility, a plurality of secondary battery housing system racks 13a to 13d for internally housing secondary batteries, for example, are used, as shown in FIG. 7. Also, in some case, one power converter 20 is provided in common for the plurality of secondary battery housing system racks 13a to 13d. In such a case, connections via a power line may be made between the secondary battery housing system racks 13a to 13d and the power converter 20. For example, an electricity storage system 97 exists in which the power converter 20 and the secondary battery housing system racks 13a to 13d are arranged in a row. In the electricity storage system 97, a positive-electrode bus 1 from a positive-electrode-side terminal 21 of the power converter 20 connects positive-electrode-side terminals 41 one to another in order of the secondary battery housing system racks 13a, 13b, 13c, and 13d. On the other hand, a negative-electrode bus 2 from a negative-electrode-side terminal 22 of the power converter 20 connects negative-electrode-side terminals 42 one to another in order of the secondary battery housing system racks 13a, 13b, 13c, and 13d.

The secondary battery housing system rack having the positive-electrode-side terminal 41 directly connected to the positive-electrode-side terminal 21 of the power converter 20 is the secondary battery housing system rack 13a, and the secondary battery housing system rack having the negative-electrode-side terminal 42 directly connected to the negative-electrode-side terminal 22 of the power converter 20 is also the same secondary battery housing system rack 13a. Therefore, a high degree of current concentration occurs on the secondary battery housing system rack 13a. In the example shown in FIG. 7, the current value at the secondary battery housing system rack 13a is highest and the current values becomes lower in order of the secondary battery housing system racks 13b, 13c, and 13d.

It is an advantage of the present invention to provide an electricity storage system capable of limiting current concentration in a case where wiring is provided between a plurality of secondary battery housing system racks and a power converter by using power lines.

Solution to Problem

An electricity storage system according to the present invention includes a plurality of secondary battery housing system racks in which secondary batteries and circuit blocks are respectively housed, and a power converter provided in common for the circuit blocks in the plurality of secondary battery housing system racks. The secondary battery housing system rack having a positive-electrode-side terminal directly connected to a positive-electrode-side terminal of the power converter by a positive-electrode bus, and the secondary battery housing system rack having a negative-electrode-side terminal directly connected to a negative-electrode-side terminal of the power converter by a negative-electrode bus, are different from each other.

Advantageous Effects of Invention

According to the above-described arrangement, the secondary battery housing system rack having a positive-electrode-side terminal directly connected to a positive-electrode-side terminal of the power converter by a positive-electrode bus, and the secondary battery housing system rack having a negative-electrode-side terminal directly connected to a negative-electrode-side terminal of the power converter by a negative-electrode bus, can be made different from each other. Therefore, current concentration due to the impedance of wiring and other elements can be limited.

DESCRIPTION OF EMBODIMENTS

Figure 1:
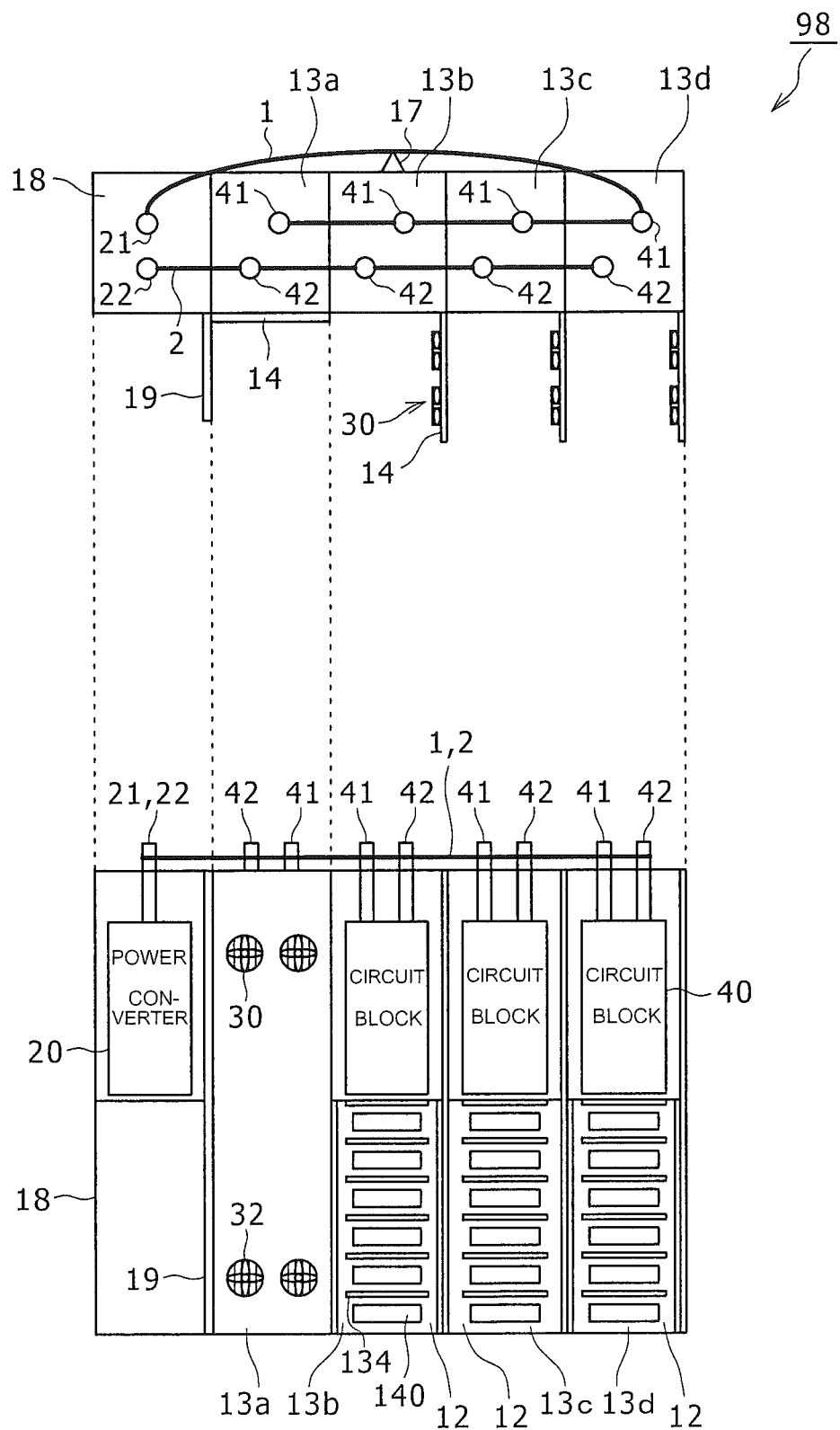
FIG. 1 is a diagram showing an electricity storage system in a first embodiment.

Embodiments of the present invention will be described in detail with reference to the drawings. The following description is made by assuming that a lithium-ion secondary battery is used as a secondary battery. However, other kinds of secondary batteries are not excluded. For example, a nickel-hydrogen battery, nickel-cadmium battery, etc., may be used. The secondary battery is used as an assembled battery constituted by a plurality of single batteries. The reason for use of an assembly battery is that a plurality of single batteries are combined to obtain a desired high voltage. Accordingly, the number of single batteries constituting an assembly battery can be changed as desired according to specifications.

Sizes, shapes, materials, etc., described below are only illustrative examples, and can be changed as required according to specifications of secondary battery housing system racks. Also, the number of secondary batteries housed in a secondary battery block, the number of secondary battery housing system racks constituting an electricity storage system and other particulars in the following description are for an illustrative purpose only.

In the following, elements identical or corresponding to each other in all the drawings are denoted by the same reference characters and redundant descriptions of them is avoided. In the following main description, reference characters referred to before are used as occasion demands.

First Embodiment

FIG. 1 is a diagram showing an electricity storage system 98. FIG. 1 shows both a top view (in an upper section of FIG. 1) and a front view (in a lower section of FIG. 1) of the electricity storage system 98. The electricity storage system 98 is configured by including a power converter housing rack 18 and secondary battery housing system racks 13a to 13d. The secondary battery housing system racks 13a to 13d are orderly disposed in one row and in four columns. FIG. 1 shows a state where, in electricity storage system 98, a front door 19 of the power converter housing rack 18, a front door 14 of the secondary battery housing system rack 13b, a front door 14 of the secondary battery housing system rack 13c and a front door 14 of the secondary battery housing system rack 13d are open.

In the power converter housing rack 18, a power converter 20 is housed. The power converter housing rack 18 has the shape of a box elongated in the vertical direction. A bottom surface of the power converter housing rack 18 in contact with an installation surface and a ceiling surface of the power converter housing rack 18 each have a generally rectangular shape. The power converter housing rack 18 is walled at three of its four sides by side wall members as external wall portions, and has the openable/closable front door 19 at the other of its four sides. The side wall members and the front door 19 of the power converter housing rack 18 are formed by using a material having suitable strength, e.g., stainless steel. While the description is given here by assuming that the front door 19 side (front door 14 side) is the front, one of the sides other than the front door 19 side (front door 14 side) can, of course, be alternatively the front.

The power converter 20 has the function of receiving the alternating current power from a power grid and carrying out power conversion into direct-current power suitable for charging each of secondary batteries 140 housed in the secondary battery housing system racks 13a to 13d, and the function of carrying out power conversion of electric power discharged from the secondary batteries 140 to supply power to a load on the power grid side.

The power converter 20 is configured by including a positive-electrode-side terminal 21 for supplying a potential on the positive electrode side necessary for operating the converter, and a negative-electrode-side terminal 22 for supplying a potential on the negative-electrode side necessary for operating the converter. The positive-electrode-side terminal 21 and the negative-electrode-side terminal 22 are provided so as to project upward from a ceiling portion of the power converter housing rack 18. The size of the power converter housing rack 18 is, for example, such that the bottom surface is about 70·70 cm and the height is about 240 cm.

The secondary battery housing system racks 13a to 13d function as racks in which the secondary batteries 140 and circuit blocks 40 are housed. The secondary battery housing system racks 13a to 13d are identical in external shape to each other. The secondary battery housing system racks 13a to 13d each have the shape of a box elongated in the vertical direction. Bottom surfaces of the secondary battery housing system racks 13a to 13d in contact with an installation surface and ceiling surfaces of the secondary battery housing system racks 13a to 13d each have a generally square shape. Each of the secondary battery housing system racks 13a to 13d is walled at three of its four sides by side wall members as external wall portions, and has the openable/closable front door 14 at the other of its four sides. The secondary battery housing system racks 13a to 13d are disposed adjacent to each other.

The side wall members and the front doors 14 of the secondary battery housing system racks 13a to 13d are formed by using a material having suitable strength, e.g., stainless steel. The size of each of the secondary battery housing system racks 13a to 13d is, for example, such that the bottom surface is about 70·70 cm and the height is about 240 cm.

In the secondary battery housing system racks 13a to 13d, air intake fan units 32 provided in lower portions of the front doors 14 of housing main bodies 12 have the function of taking in air from the outside of the secondary battery housing system racks 13a to 13d to the inside. Also, exhaust fan units 30 provided in upper portions of the front doors 14 have the function of discharging air from the interiors of the secondary battery housing system racks 13a to 13d to the outside. Each of the air intake fan units 32 and the exhaust fan units 30 is constructed by including an opening portion provided in the front door 14 and a fan mounted in the front door 14 in correspondence with the opening portion. The operations of the air intake fan units 32 and the exhaust fan units 30 are controlled by the circuit blocks 40.

Each of the circuit blocks 40 housed on the housing main bodies 12 of the secondary battery housing system racks 13a to 13d is configured by including a control unit and a breaker unit. The control unit has a charge/discharge control function to control components including charge/discharge switches included in the breaker unit and the control unit according to information (such as a current value, a voltage value and an abnormality signal) from the breaker unit to be controlled by the control unit and the secondary batteries 140, and a charge/discharge command transmitted from the outside. The breaker unit has the function of shutting off charge/discharge power between the power converter 20 and the secondary batteries 140 under the control of the control unit. The circuit block 40 includes a positive-electrode-side terminal 41 for supplying the potential on the positive electrode side necessary for operating the converter and a negative-electrode-side terminal 42 for supplying the potential on the negative electrode side necessary for operating the converter. The positive-electrode-side terminal 41 and the negative-electrode-side terminal 42 are provided so as to project upward from a ceiling portion of the corresponding one of the secondary battery housing system racks 13a to 13d. While the circuit block 40 has been described assuming that it includes the control unit and the breaker unit, it is not necessarily required that the circuit block 40 include all the components. For example, the circuit block 40 may include the breaker unit only.

The secondary batteries 140 are an assembled lithium-ion battery constituted by an assembled battery case and a plurality of lithium-ion secondary batteries housed in the assembled battery case. In the example shown in FIG. 1, six secondary batteries 140 and six fire-resistant insulating material boards 134 are alternately disposed in the top-bottom direction along the direction of gravity.

The fire-resistant insulating material boards 134 are board members for thermal isolation between the adjacent pairs of the secondary batteries 140. More specifically, calcium silicate boards having excellent fire resistance, heat insulating effect and strength are used. The fire-resistant insulating material boards 134 are shielding flat boards having a gas shielding effect in the board thickness direction and having no openings such as worked holes, such that even in the case of fire in one of the secondary batteries 140, the fire cannot reach the adjacent secondary batteries 140.

The relationship between the disposition of the power converter housing rack 18 and the disposition of the secondary battery housing system racks 13a to 13d in the electricity storage system 98 will be described with reference to FIG. 1.

The power converter housing rack 18 is disposed as shown in FIG. 1. The secondary battery housing system rack 13a, the secondary battery housing system rack 13b, the secondary battery housing system rack 13c and the secondary battery housing system rack 13d are disposed adjacent to each other in this order from the power converter housing rack 18 side, with the front doors 14 facing in the same direction as the front door 19 of the power converter housing rack 18. It is preferable from the viewpoint of maintenance or the like to dispose the racks so that the faces of the front doors 14 are flush with the front door 19 of the power converter housing rack 18 in this case.

Routes of wiring of a positive-electrode bus 1 connecting the positive-electrode-side terminals, and a negative-electrode bus 2 connecting the negative-electrode-side terminals on the power converter housing rack 18 and the secondary battery housing system racks 13a to 13d, orderly disposed as described above, will be described.

The positive-electrode bus 1 is led from the positive-electrode-side terminal 21 at the power converter housing rack 18, is engaged with a projection 17 provided on the back surface side of the secondary battery housing system rack 13b, and is connected to the positive-electrode-side terminal 41 at the secondary battery housing system rack 13d by bypassing the secondary battery housing system racks 13a to 13c. Thereafter, the positive-electrode-side terminals 41 are connected one to another in order of the secondary battery housing system racks 13c, 13b, and 13a by the positive-electrode bus 1. That is, the positive-electrode bus 1 is routed so that the wiring route is substantially U-shaped as seen in the top view.

The negative-electrode bus 2 from the negative-electrode-side terminal 22 at the power converter housing rack 18 connects the negative-electrode-side terminals 42 one to another in order of the secondary battery housing system racks 13a, 13b, 13c, and 13d.

The operation of the electricity storage system 98 will next be described. In the electricity storage system 98, the secondary battery housing system rack having the positive-electrode-side terminal 41 directly connected to the positive-electrode-side terminal 21 at the power converter housing rack 18, and the secondary battery housing system rack having the negative-electrode-side terminal 42 directly connected to the negative-electrode-side terminal 22 at the power converter housing rack 18, are different from each other. As a result, current concentration due to the impedance of the wiring and other elements can be limited. "Positive-electrode-side terminal 41 directly connected to the positive-electrode-side terminal 21" means one of the positive-electrode-side terminals 41 first connected as viewed from the positive-electrode-side terminal 21. Also, "negative-electrode-side terminal 42 directly connected to the negative-electrode-side terminal 22" means one of the negative-electrode-side terminals 42 first connected as viewed from the negative-electrode-side terminal 22.

The bus engaged with the projection 17 may alternatively be not the positive-electrode bus 1 but the negative-electrode bus 2.

Second Embodiment

Figure 2:
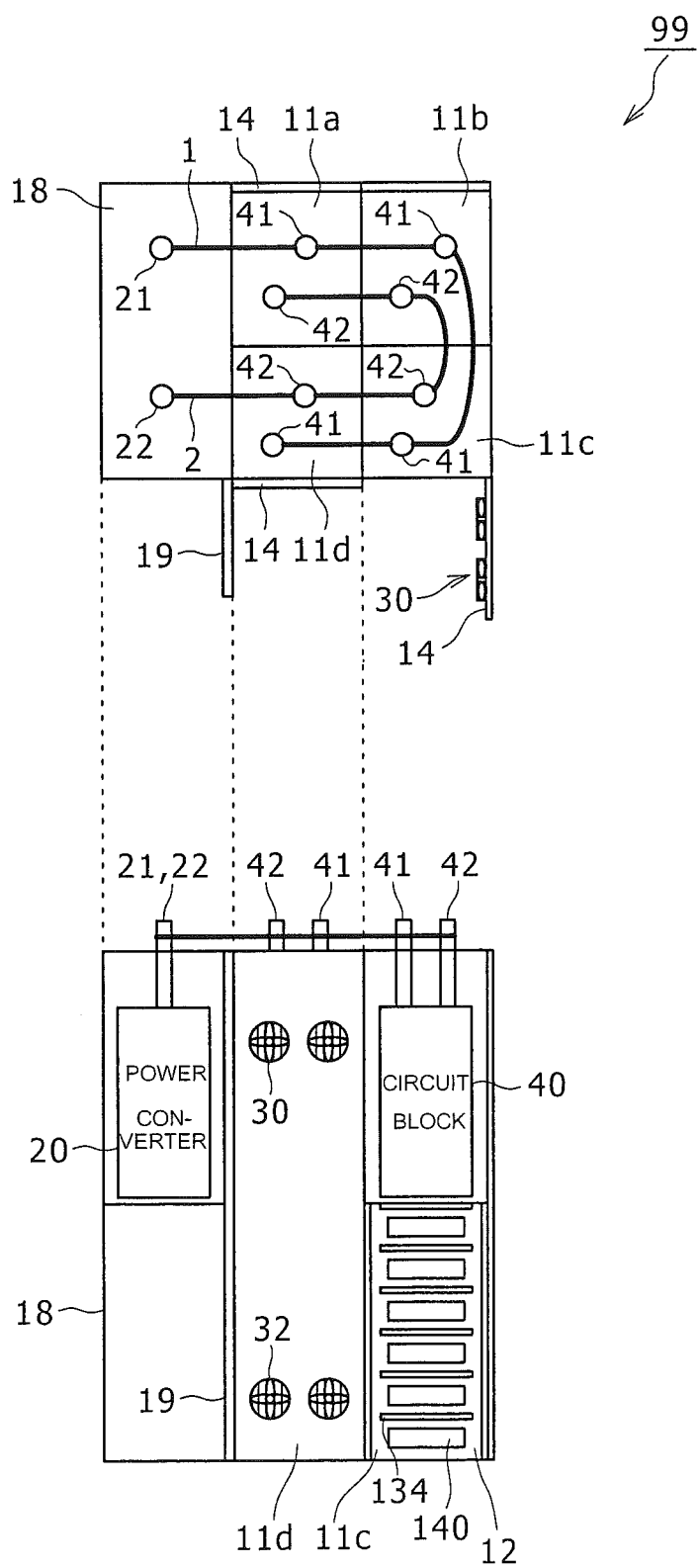
FIG. 2 is a diagram showing an electricity storage system in a second embodiment.

FIG. 2 is a diagram showing an electricity storage system 99. Points of difference between the electricity storage system 99 and the electricity storage system 98 reside in the size of the power converter housing rack 18 and the array of the second battery housing system racks 11a to 11d. Description will be given mainly of the points of difference. As shown in FIG. 2, the secondary battery housing system racks 11a to 11d are orderly disposed in two rows and in two columns. The secondary battery housing system racks 11a to 11d each have the same construction as that of the secondary battery housing system racks 13a to 13d, and detailed description of the construction will not be repeated.

The size of the power converter housing rack 18 is, for example, such that the bottom surface is about 70·140 cm and the height is about 240 cm. Therefore, a combination of two of the secondary battery housing system racks 11a to 11d has the same size as that of the power converter housing rack 18 if the two secondary battery housing system racks are disposed adjacent to each other.

The relationship between the disposition of the power converter housing rack 18 and the disposition of the secondary battery housing system racks 11a to 11d in the electricity storage system 99 will be described with reference to FIG. 2.

The power converter housing rack 18 is disposed as shown in FIG. 2. The secondary battery housing system rack 11a and the secondary battery housing system rack 11b are disposed adjacent to each other in this order from the power converter housing rack 18 side, with the front doors 14 facing toward the back wall side of the power converter housing rack 18 opposite from the front door 19. It is preferable to dispose the racks so that the faces of the front doors 14 are flush with the face of the back wall of the power converter housing rack 18 opposite from the front door 19 in this case.

Also, the secondary battery housing system rack 11d and the secondary battery housing system rack 11c are disposed adjacent to each other in this order from the power converter housing rack 18 side, with the front doors 14 facing in the same direction as the front door 19 of the power converter housing rack 18. It is preferable to dispose the racks so that the faces of the front doors 14 are flush with the face of the front door 19 of the power converter housing rack 18 in this case.

Routes of wiring of a positive-electrode bus 1 connecting the positive-electrode-side terminals, and a negative-electrode bus 2 connecting the negative-electrode-side terminals on the power converter housing rack 18 and the secondary battery housing system racks 11a to 11d, orderly disposed as described above, will be described.

The positive-electrode bus 1 has its one end connected to the positive-electrode-side terminal 21 at the power converter housing rack 18 and is successively connected to the positive-electrode-side terminal 41 at the secondary battery housing system rack 11a adjacent to the power converter housing rack 18, to the positive-electrode-side terminal 41 at the secondary battery housing system rack 11b adjacent to the secondary battery housing system rack 11a, to the positive-electrode-side terminal 41 at the secondary battery housing system rack 11c adjacent to the secondary battery housing system rack 11b, and to the positive-electrode-side terminal 41 at the secondary battery housing system rack 11d adjacent to the secondary battery housing system rack 11c. That is, the positive-electrode bus 1 is led so that the wiring route is substantially U-shaped as seen in the top view.

The negative-electrode bus 2 has its one end connected to the negative-electrode-side terminal 22 at the power converter housing rack 18 and is successively connected to the negative-electrode-side terminal 42 at the secondary battery housing system rack 11d adjacent to the power converter housing rack 18, to the negative-electrode-side terminal 42 at the secondary battery housing system rack 11c adjacent to the secondary battery housing system rack 11d, to the negative-electrode-side terminal 42 at the secondary battery housing system rack 11b adjacent to the secondary battery housing system rack 11c, and to the negative-electrode-side terminal 42 at the secondary battery housing system rack 11a adjacent to the secondary battery housing system rack 11b. That is, the negative-electrode bus 2 is led so that the wiring route is substantially U-shaped as seen in the top view.

The operation of the electricity storage system 99 will next be described. In the electricity storage system 99, the secondary battery housing system rack having the positive-electrode-side terminal 41 directly connected to the positive-electrode-side terminal 21 at the power converter housing rack 18 and the secondary battery housing system rack having the negative-electrode-side terminal 42 directly connected to the negative-electrode-side terminal 22 at the power converter housing rack 18 are different from each other. As a result, current concentration due to the impedance of the wiring and other elements can be limited.

Another advantage of the electricity storage system 99 is as described below. Since the positive-electrode bus 1 connects the positive-electrode-side terminals 41 while being routed from the positive-electrode-side terminal 21 at the power converter housing rack 18 so that the wiring route is substantially U-shaped as seen in the top view, the wiring route can be shortened in comparison with a case where the positive-electrode bus 1 is connected in the way according to the first embodiment, thus limiting power loss. Power loss can also be limited with respect to the negative-electrode bus 2.

Third Embodiment

Figure 3:
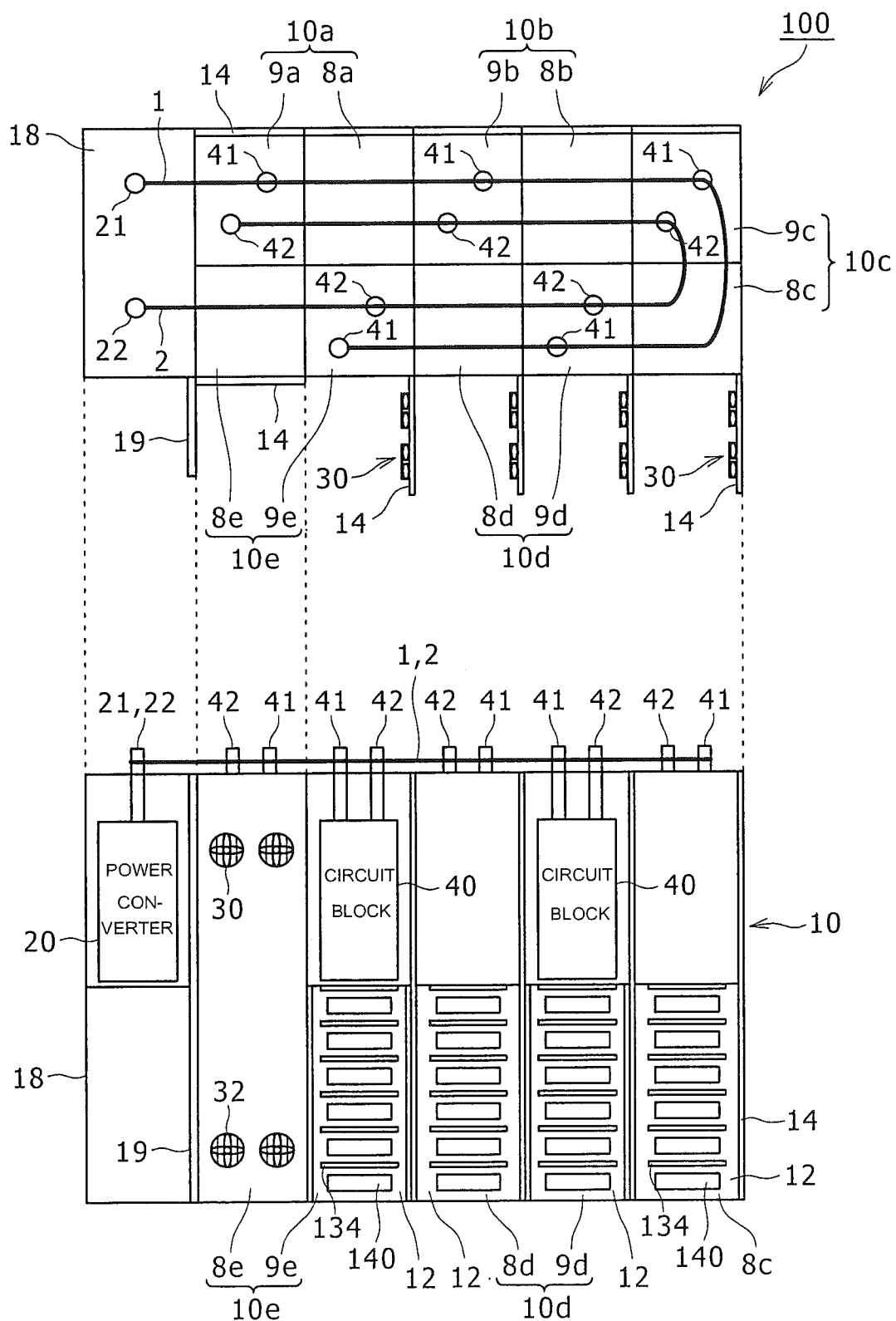
FIG. 3 is a diagram showing an electricity storage system in a third embodiment.

FIG. 3 is a diagram showing an electricity storage system 100. Points of difference between the electricity storage system 100 and the electricity storage system 99 reside in second battery housing system racks 10a to 10e. Description will be given mainly of the points of difference. The second battery housing system racks 10a to 10e respectively include first housing rack portions 8a to 8e and second housing rack portions 9a to 9e. As shown in FIG. 3, the first housing rack portions 8a to 8e and second housing rack portions 9a to 9e are orderly disposed in two rows and in five columns. Each of circuit blocks 40 is configured by including a control unit and a breaker unit corresponding to secondary batteries 140 housed in one of the second housing rack portions 9a to 9b in which the circuit block 40 is housed and secondary batteries 140 housed in one of the first housing rack portions 8a to 8e. The secondary batteries 140 housed in the first housing rack portions 8a to 8e and the secondary batteries 140 housed in the second housing rack portions 9a to 9e in correspondence with those in the first housing rack portions 8a to 8e are electrically connected to each other. The second housing rack portions 9a to 9e are constructed in the same way as the secondary battery housing system racks 13a to 13d of the electricity storage system 98 in the first embodiment and the secondary battery housing system racks 11a to 11d of the electricity storage system 99 in the second embodiment. Therefore the detailed description for the housing rack portions 9a to 9e will not be repeated.

The first housing rack portions 8a to 8e are racks in which the secondary batteries 140 are housed while no circuit blocks 40 are provided. The number of circuit blocks 40 in the secondary battery housing system racks 10a to 10e can be limited because it is not necessary to provide circuit blocks 40 in all the racks. That is, the first housing rack portions 8a to 8e can be provided between the second housing rack portions 9a to 9e in which the circuit blocks 40 are housed. In a case where no first housing rack portions 8a to 8e are provided, increasing the second housing rack portions 9a to 9e in size or increasing the number of second housing rack portions 9a to 9b including circuit blocks 40 may be considered for the purpose of increasing the number of secondary batteries 140. The above-described construction enables satisfying a requirement by only adding first housing rack portions 8a to 8e.

Routes of wiring of a positive-electrode bus 1 connecting the positive-electrode-side terminals and a negative-electrode bus 2 connecting the negative-electrode-side terminals on the power converter housing rack 18 and the secondary battery housing system racks 10a to 10e orderly disposed as described above will be described.

The positive-electrode bus 1 has one end connected to the positive-electrode-side terminal 21 at the power converter housing rack 18 and is successively connected to the positive-electrode-side terminal 41 at the secondary battery housing system rack 10a adjacent to the power converter housing rack 18, to the positive-electrode-side terminal 41 at the secondary battery housing system rack 10b adjacent to the secondary battery housing system rack 10a, to the positive-electrode-side terminal 41 at the secondary battery housing system rack 10c adjacent to the secondary battery housing system rack 10b, and to the positive-electrode-side terminal 41 at the secondary battery housing system rack 10d adjacent to the secondary battery housing system rack 10c. The other end terminal of the positive-electrode bus 1 is connected to the positive-electrode-side terminal 41 at the secondary battery housing system rack 10e adjacent to the secondary battery housing system rack 10d. That is, the positive-electrode bus 1 is routed so that the wiring route is U-shaped as seen in the top view.

The negative-electrode bus 2 has one end connected to the negative-electrode-side terminal 22 at the power converter housing rack 18 and is successively connected to the negative-electrode-side terminal 42 at the secondary battery housing system rack 10e adjacent to the power converter housing rack 18, to the negative-electrode-side terminal 42 at the secondary battery housing system rack 10d adjacent to the secondary battery housing system rack 10e, to the negative-electrode-side terminal 42 at the secondary battery housing system rack 10c adjacent to the secondary battery housing system rack 10d, and to the negative-electrode-side terminal 42 at the secondary battery housing system rack 10b adjacent to the secondary battery housing system rack 10c. The other end terminal of the negative-electrode bus 2 is connected to the negative-electrode-side terminal 42 at the secondary battery housing system rack 10a adjacent to the secondary battery housing system rack 10b. That is, the negative-electrode bus 2 is routed so that the wiring route is U-shaped as seen in the top view.

The operation of the electricity storage system 100 will next be described. In the electricity storage system 100, the secondary battery housing system rack having the positive-electrode-side terminal 41 directly connected to the positive-electrode-side terminal 21 at the power converter housing rack 18 and the secondary battery housing system rack having the negative-electrode-side terminal 42 directly connected to the negative-electrode-side terminal 22 at the power converter housing rack 18 are different from each other. As a result, current concentration due to the impedance of the wiring and other elements can be limited.

Another advantage of the electricity storage system 100 is as described below. Since the positive-electrode bus 1 connects the positive-electrode-side terminals 41 while being routed from the positive-electrode-side terminal 21 at the power converter housing rack 18 so that the wiring route is substantially U-shaped as seen in the top view, the wiring route can be shortened in comparison with a case where the power converter housing rack 18 and the secondary battery housing system racks 10a to 10e are not orderly disposed, thus limiting power loss. Power loss can also be limited with respect to the negative-electrode bus 2.

Figure 4:
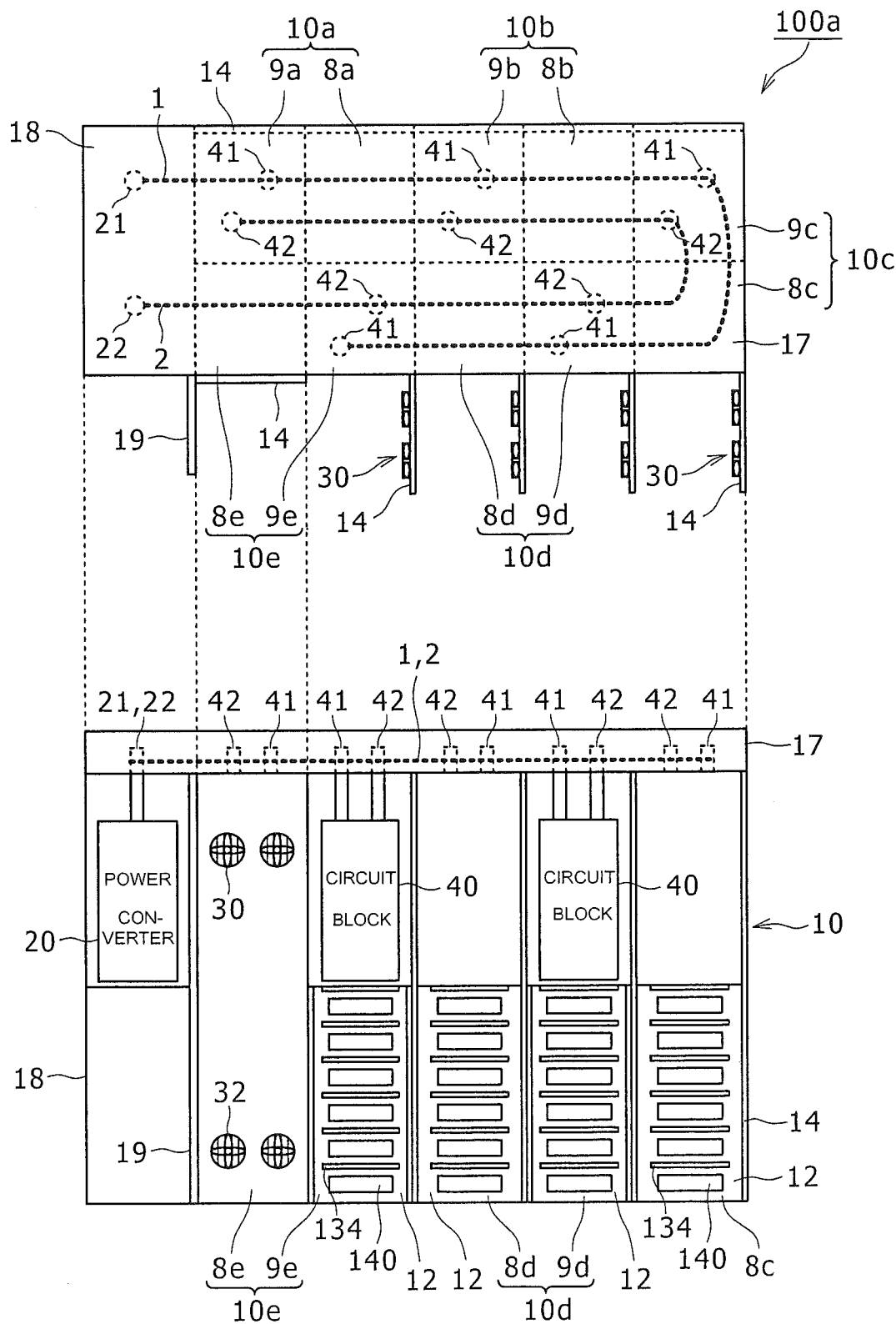
FIG. 4 is a diagram showing a first modified example of the electricity storage system in the third embodiment.

FIG. 4 is a diagram showing an electricity storage system 100a, which is a first modified example of the electricity storage system 100. A point of difference between the electricity storage system 100a and the electricity storage system 100 resides in the provision of an upper-side rack 17. Description will be given of the point of difference.

The upper-side rack 17 is a rack having the shape of a cover and mounted so as to cover substantially the entire surface at the upper surface side of the array of the power converter housing rack 18 and the secondary battery housing system racks 10a to 10e that are orderly disposed. The upper-side rack 17 has such an internal capacity that the whole of the positive-electrode bus 1 and the negative-electrode bus 2 is housed therein through its opening when the upper-side rack 17 is placed so as to cover the upper surface side of the array of the power converter housing rack 18 and the secondary battery housing system racks 10a to 10e orderly disposed. The opening of the upper-side rack 17 may have at least an opening area enough to allow the whole of the positive-electrode bus 1 and the negative-electrode bus 2 to be housed. For description here, it is assumed that the opening area is substantially equal to the sum of the upper surface areas of the power converter housing rack 18 and the secondary battery housing system racks 10a to 10e. The upper-side rack 17 is described by assuming that it is formed by using a material having suitable strength, e.g., stainless steel, as are the power converter housing rack 18 and the secondary battery housing system racks 10a to 10e. However, needless to say, the upper-side rack 17 may be formed by using a different material. It is preferred that a fire-resistant insulating member be disposed in the upper-side rack 17. The surfaces of the positive-electrode bus 1 and the negative-electrode bus 2 are coated with an insulating tape or the like for ensuring safety. However, a higher degree of safety can be ensured by means of the upper-side rack 17.

Figure 5:
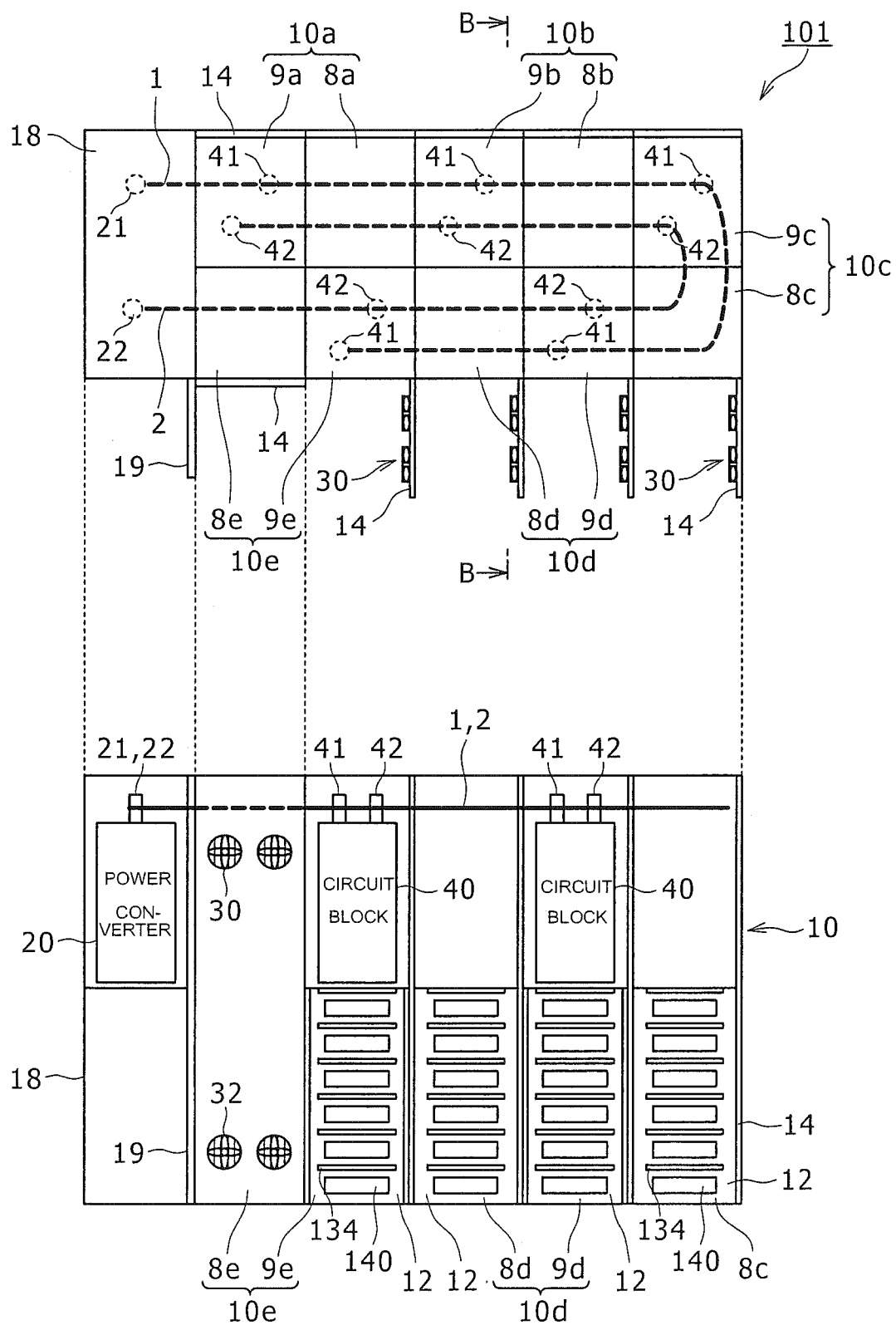
FIG. 5 is a diagram showing a second modified example of the electricity storage system in the third embodiment.
Figure 6:
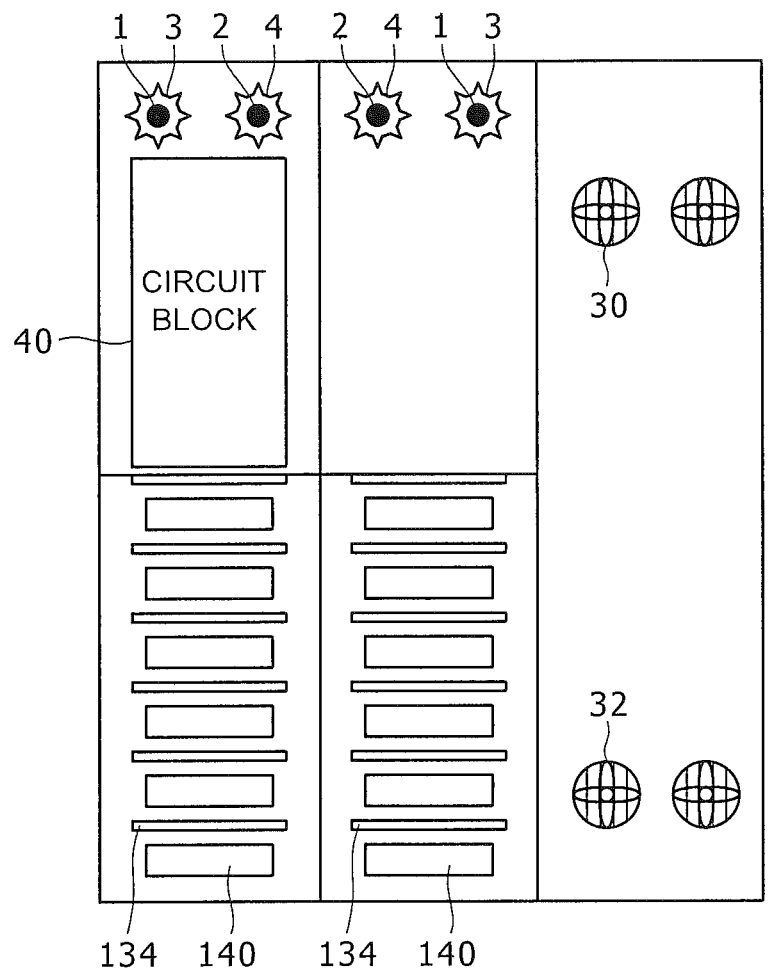
FIG. 6 is a sectional view taken along line B-B in FIG. 5.
Figure 7:
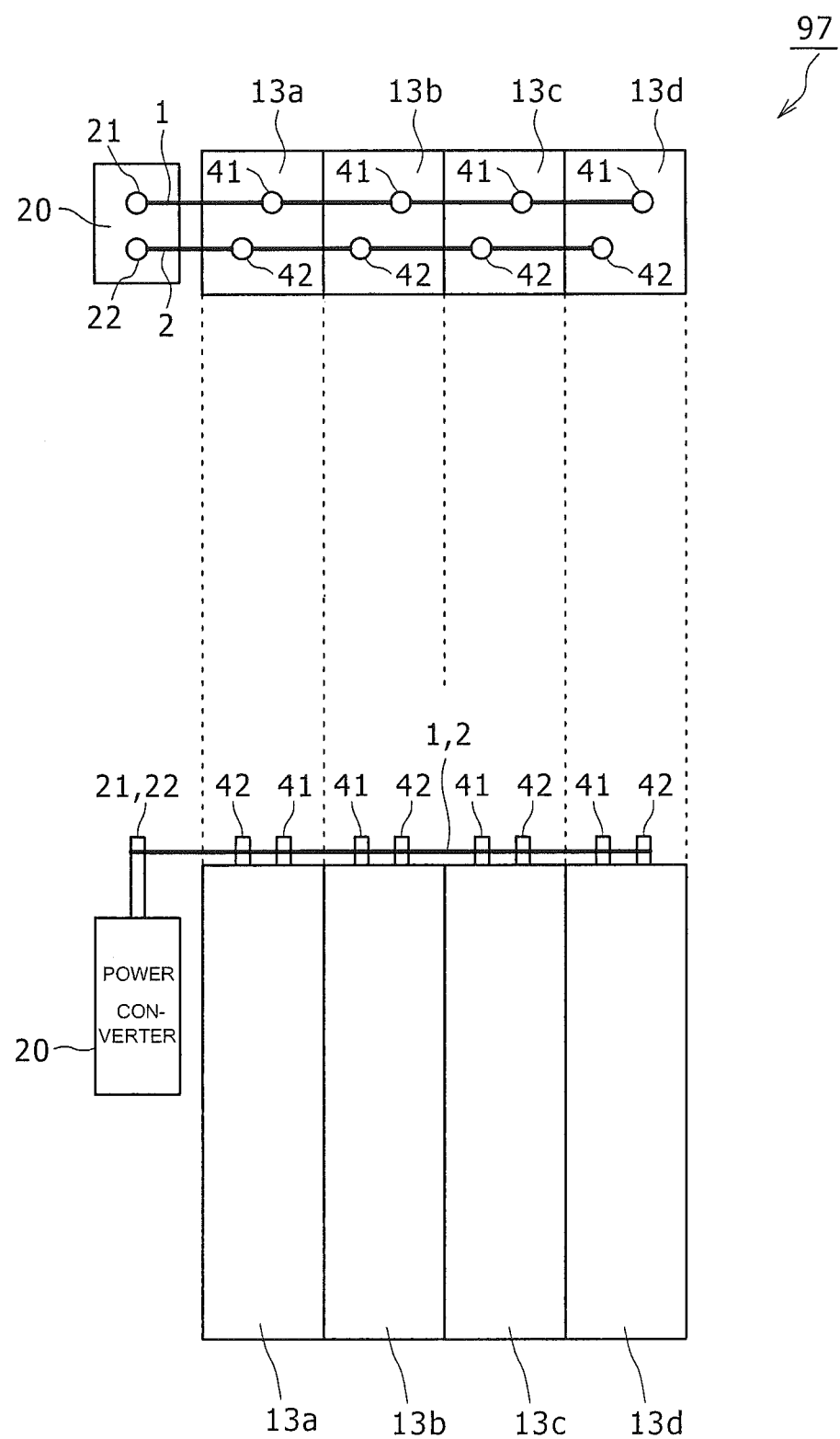
FIG. 7 is a diagram showing an electricity storage system in a conventional art.

FIG. 5 shows an electricity storage system 101, which is a second modified example of the electricity storage system 100. FIG. 6 is a sectional view taken along line B-B in FIG. 5. A point of difference between the electricity storage system 101 and the electricity storage system 100 resides in that the positive-electrode bus 1 and the negative-electrode bus 2 are led not outside the secondary battery housing system racks 10a to 10e but into the secondary battery housing system racks 10a to 10e.

The positive-electrode-side terminal 21 and the negative-electrode-side terminal 22 at the power converter housing rack 18 are provided in the vicinity of ceiling portions in the housing main bodies.

The positive-electrode-side terminals 41 and the negative-electrode-side terminals 42 at the secondary battery housing system racks 10a to 10e are provided in the vicinity of ceiling portions in the housing main bodies 12.

In the electricity storage system 101, each of the positive-electrode bus 1 and the negative-electrode bus 2 is routed so that the wiring route is substantially U-shaped as seen in the top view, as are those in the electricity storage system 100. To enable this wiring, positive-electrode bus through holes 3 and negative-electrode bus through holes 4 are provided in each of the external walls of the power converter housing rack 18 and the secondary battery housing system racks 10a to 10e. The positive-electrode bus 1 and the negative-electrode bus 2 are routed by being passed through the positive-electrode bus through holes 3 and the negative-electrode bus through holes 4.

The positive-electrode bus through holes 3 and the negative-electrode bus through holes 4 are formed in the external wall of the second housing rack portion 9b. Also, the positive-electrode bus through holes 3 and the negative-electrode bus through holes 4 are formed in the external wall of the first housing rack portion 8d.

The positive-electrode bus through holes 3 and the negative-electrode bus through holes 4 have identical shapes to each other, and the hole areas of the through holes are slightly larger than the sectional areas of the positive-electrode bus 1 and the negative-electrode bus 2. Each of the positive-electrode bus through holes 3 and the negative-electrode bus through holes 4 has a plurality of cut portions extending radially along directions from the hole center. The positive-electrode bus through holes 3 and the negative-electrode bus through holes 4 are respectively provided in the external walls located at the adjacent portions of the elemental bodies of the power converter housing rack 18 and the secondary battery housing system racks 10a to 10e, orderly disposed.

The operation of the electricity storage system 101 will next be described. Also in the electricity storage system 101, the secondary battery housing system rack having the positive-electrode-side terminal 41 directly connected to the positive-electrode-side terminal 21 at the power converter housing rack 18 and the secondary battery housing system rack having the negative-electrode-side terminal 42 directly connected to the negative-electrode-side terminal 22 at the power converter housing rack 18 are different from each other. As a result, current concentration due to the impedance of the wiring and other elements can be limited.

Further, since in the electricity storage system 101 the positive-electrode bus 1 and the negative-electrode bus 2 are housed in the power converter housing rack 18 and the secondary battery housing system racks 10a to 10e, the electricity storage system 101 can be constructed more compactly. In this case, there is a possibility of superimposition of a residual magnetic flux produced in the external wall because the directions of currents flowing through the positive-electrode bus 1 and the negative-electrode bus 2 coincide with each other. The residual magnetic flux, however, can be shut off because the plurality of cut portions extending radially along the directions from the hole center are provided in the positive-electrode bus through holes 3 and the negative-electrode bus through holes 4. While the provision of the two through holes, namely the positive-electrode bus through hole 3 and the negative-electrode bus through hole 4 to deal with the coincidence between the directions of currents flowing through the positive-electrode bus 1 and the negative-electrode bus 2 has been described, the positive-electrode bus 1 and the negative-electrode bus 2 can be passed through one through hole in a case where the directions of currents flowing through the positive-electrode bus 1 and the negative-electrode bus 2 are different from each other. In such a case, the above-described cut portions may be provided in the one through hole to shut off a residual magnetic flux.

Another advantage of the electricity storage system 101 is as described below. Since the positive-electrode bus 1 connects the positive-electrode-side terminals 41 while being routed from the positive-electrode-side terminal 21 at the power converter housing rack 18 so that the wiring route is substantially U-shaped as seen in the top view, the wiring route can be shortened in comparison with a case where the power converter housing rack 18 and the secondary battery housing system racks 10a to 10e are not orderly disposed, thus limiting power loss. Power loss can also be limited with respect to the negative-electrode bus 2.

While the forms of the wiring routes of the positive-electrode bus 1 and the negative-electrode bus 2 have been described as U-shaped as seen in the top view, the forms of the positive-electrode bus 1 and the negative-electrode bus 2 are not limited to those "as seen in the top view". For example, if the electricity storage system 98, 99, 100, 100a, or 101 is installed in a state of being fallen sideways, the forms of the wiring routes of the positive-electrode bus 1 and the negative-electrode bus 2 can be said to be U-shaped as seen in a side view or in a front view.

While each embodiment has been described assuming that a power converter is housed in the power converter housing rack, the positive-electrode bus and the negative-electrode bus may alternatively be connected to a positive-electrode terminal and a negative-electrode terminal of a power converter, and not housed in the power converter housing rack.

The invention claimed is:

1. An electricity storage system comprising:
    a plurality of secondary battery housing system racks in which secondary batteries and circuit blocks are respectively housed; and
    a power converter provided in common for the circuit blocks in the plurality of secondary battery housing system racks,
    wherein the secondary battery housing system rack having a positive-electrode-side terminal directly connected to a positive-electrode-side terminal of the power converter by a positive-electrode bus, and the secondary battery housing system rack having a negative-electrode-side terminal directly connected to a negative-electrode-side terminal of the power converter by a negative-electrode bus, are different from each other,
    wherein the positive-electrode-side terminal of the secondary battery housing system rack being directly connected to the positive-electrode-side terminal of the power converter means one of the positive-electrode-side terminals of the secondary battery housing system rack is first connected to the positive-electrode-side terminal of the power converter when viewed from the positive-electrode-side terminal of the power converter, while the negative-electrode-side terminal of the secondary battery housing system being directly connected to the negative-electrode-side terminal of the power converter means one of the negative-electrode-side terminals of the secondary battery housing system rack is first connected to the negative-electrode-side terminal of the power converter when viewed from the negative-electrode-side terminal of the power converter.

2. The electricity storage system according to claim 1, further comprising a power converter housing rack in which the power converter is housed, and which is orderly disposed together with the plurality of secondary battery housing system racks.

3. The electricity storage system according to claim 1, wherein the positive-electrode bus and the negative-electrode bus are routed so that at least one of the positive-electrode bus and the negative-electrode bus is substantially U-shaped.

4. The electricity storage system according to claim 1, wherein the positive-electrode bus and the negative-electrode bus are routed so as to be passed through holes provided in external walls of the plurality of secondary battery housing system racks and the power converter housing rack.

5. The electricity storage system according to claim 4, wherein the through holes have cut portions.

6. The electricity storage system according to claim 1, further comprising an upper-side rack mounted so as to cover upper surfaces of the power converter housing rack and the plurality of secondary battery housing system racks orderly disposed, the upper-side rack having the shape of a cover,
    wherein the positive-electrode bus and the negative-electrode bus are routed in the upper-side rack.

7. The electricity storage system according to claim 1, wherein each of the secondary battery housing system racks has:
    a first housing rack portion in which the secondary battery is housed; and
    a second housing rack portion which is disposed adjacent to the first housing rack portion, and in which the circuit block is housed in addition to the secondary battery,
    wherein the circuit block controls charging and discharging of the secondary batteries housed in the first housing rack portion and the second housing rack portion.

* * * * *